Nov. 14, 1933.　　　E. H. SMYTHE　　　1,935,301

SOUND REPRODUCING SYSTEM

Filed Sept. 13, 1930　　　2 Sheets-Sheet 1

INVENTOR
E. H. SMYTHE
BY
G. H. Heydt
ATTORNEY

Nov. 14, 1933.     E. H. SMYTHE     1,935,301
SOUND REPRODUCING SYSTEM
Filed Sept. 13, 1930     2 Sheets-Sheet 2
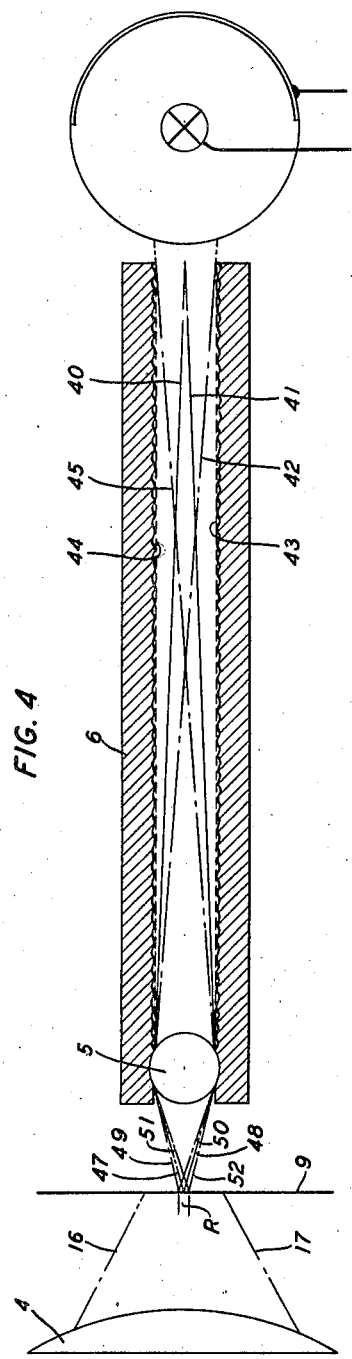
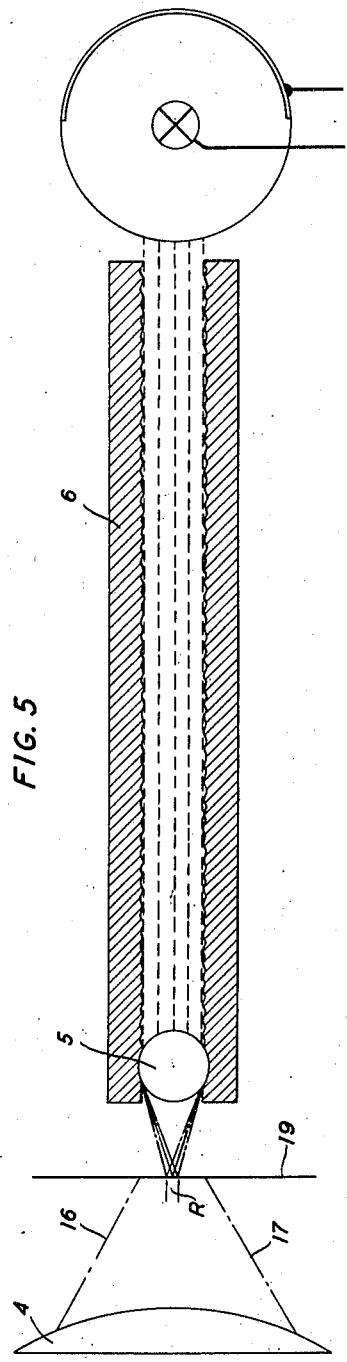
INVENTOR
E. H. SMYTHE
BY
G. H. Heydt
ATTORNEY Patented Nov. 14, 1933

1,935,301

UNITED STATES PATENT OFFICE 1,935,301

SOUND REPRODUCING SYSTEM

Edwin H. Smythe, Evanston, Ill., assignor to Bell Telephone Laboratories, Incorporated, New York, N. Y., a corporation of New York Application September 13, 1930
Serial No. 481,732

8 Claims. (Cl. 179—100.31)

This invention relates to improved apparatus for reproducing sounds photographically recorded on a film.

In a number of sound picture systems in use at the present time, the reproducing of sound photographically recorded on a film is accomplished by projecting light rays of constant intensity to an opaque screen containing a slit beyond which the film is constantly in motion. The light is projected through the slit and the film to a light sensitive cell for transformation of the light variations due to the variations in translucency of the film into correspondingly varying electric currents which currents after amplification are transmitted to a loud speaker.

The frequency range of sound recorded on the film that may be reproduced is determined by the speed of the film and the width of the slit in the direction of movement of the film. For a given speed of travel of the film, the narrower the slit the higher the recorded sound frequencies that may be reproduced.

Heretofore the so-called physical slit or contact slit, in order that it may function properly in effecting resolution of the photographic sound record on the film, has been placed so close to the surface of the film as to be practically in rubbing contact. Such rubbing engagement between the film and the slit block tends to mar the surface of the film and also to clog the slit with dust and abraded fragments of the emulsion. When, to overcome this difficulty, the slit is withdrawn from substantial physical contact with the film, the slit largely loses its light restricting and defining function and its ability to effect resolution of the higher recorded frequencies.

An object of this invention is to provide a sound reproducing system having the ability to effect the resolution of the higher recorded frequencies, in which light from a source is converged both laterally and longitudinally with relation to the film record for illuminating the sound record at the film and in which the area of the film sound record instantaneously active in the reproduction of sound from the photographic record viewed by a light sensitive cell is determined by a lens supported in one end of an elongated slot or tube. The length of the tube is determined by the focal length of said lens and the lens is removed from the film surface a sufficient distance to be free from difficulties arising from rubbing engagement.

In accordance with one embodiment of this invention two lenses are placed between an exciting lamp and the film. One lens is used for converging the light rays in one dimension and the second lens for converging the light rays in another dimension of the film sound record. The light rays are thus converged into a solid angle for illuminating an area of the film somewhat greater in each dimension than the area of the sound record used for the reproduction of sounds. Since the intensity of light in the line of light projected upon the film is a direct function of the solid angle of light at the film these lenses are such as to converge the light rays at a large angle in order to provide a high intensity of light at the film sound record. On the side of the film opposite to the light source an objective lens is mounted in the end of an elongated slot or tube preferably rectangular in shape. The preferred form of the objective lens is a round rod of small diameter. The lens in the end of the tube, is placed with relation to the film according to its focal length. This lens is, however, in any case sufficiently removed from the film surface so that there is no possibility of rubbing engagement between the film and lens or tube. A light sensitive cell is positioned at the alternate end of the tube for excitation in accordance with the variations in translucency of the sound record.

The objective lens mounted in one end of the tube may be positioned so that the plane of the film is in one conjugate focus thereof or it may be positioned so that the plane of the film is in the principal focus. When the plane of the film is in one conjugate focus of the film, the position of the alternate conjugate focus of the lens is at the alternate end of the tube. In the latter arrangement the height or dimension of the tube in the direction of travel of the film and the length of the tube are such as to permit the light rays from an illuminated area of the film approximately one mil in height to be projected to the light sensitive cell. These light rays are diffused by a concave window or lens placed in the end of the tube nearest the light sensitive cell.

Internal reflections of light from the top and bottom walls of the tube would have the effect of broadening the angle at which light passes through the film and, therefore, decreasing to some extent the sharpness of definition of the active area of the film in the direction of its travel. For this reason the top and bottom walls of the tube are roughened and made light absorbent to prevent such reflection.

In the accompanying drawings Fig. 1 illustrates diagrammatically a sectional view of a reproducing system according to this invention.

Fig. 4 illustrates the path of light rays from the film to the light sensitive cell when the lens and film are so related that the plane of the film is at one conjugate focus of the lens.

Fig. 5 illustrates the path of light rays from the film to the light sensitive cell when the film and lens are so related that the plane of the film is in the principal focus of the lens.

Figure 1:
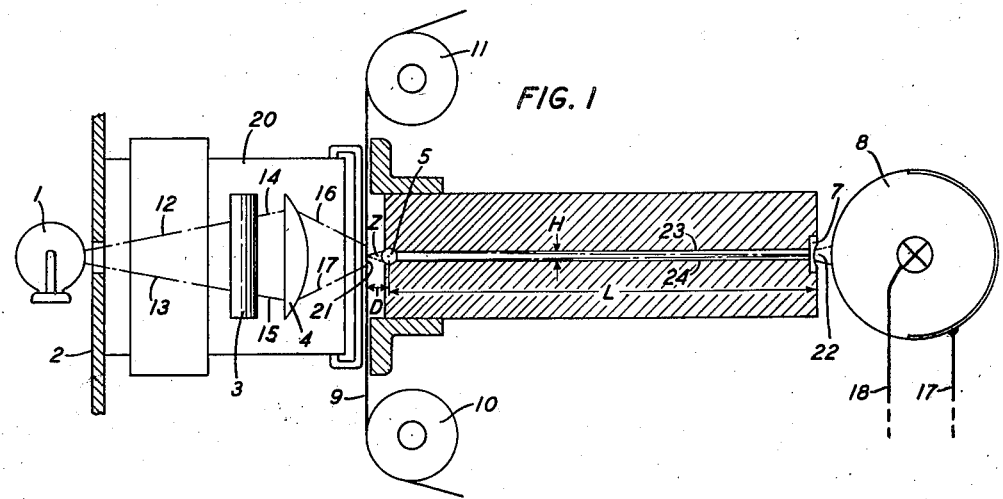
Figure 2:
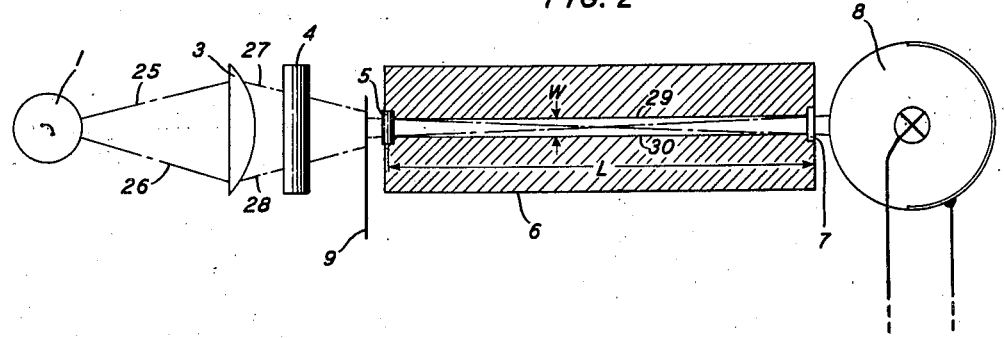
Figs. 2 and 3 are plan views in section of Fig. 1 and show two forms of the slot or tube framework to illustrate different widths of the slot in the direction of the width of the film sound record.
Figure 3:
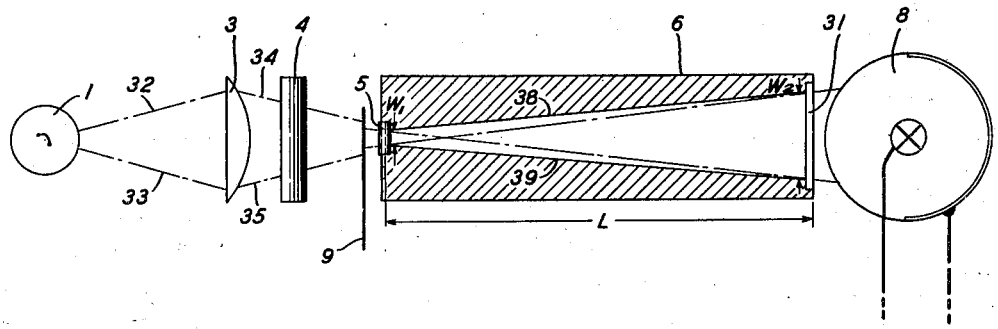

Referring to the drawings Fig. 1, a lamp 1 is shown as a suitable light source for projecting light rays to the film through the tubular envelope 20. The cylindrical lens 3 is used for the purpose of converging the light rays at a comparatively large angle to the film sound track in the direction of the lateral dimension of the film or width of the sound record. This is best seen in Figs. 2 and 3 which show the outer light rays 27 and 28 converging upon the sound record. Lens 4 is best shown in Fig. 1 and is for the purpose of converging the light rays at a broad angle to the film sound record to cover an area of the film approximately 10 mils in height or in the direction of travel of the film. The outer light rays are shown by lines 16 and 17. It will thus be noted that the light rays from the light source 1 are converged in both the longitudinal and lateral dimensions of the film to produce a solid angle of light upon the film sound record. This is of considerable advantage since the intensity of light in the line of light projected upon the film is a direct function of the solid angle of the light at the film.

The film 9 is of conventional design and is maintained in constant motion by the constantly rotating sound sprocket 10. The guide roller 11 guides the film into the film aperture and through the light from the light source 1 as converged by the lenses 3 and 4.

Tubular member 6 may be made of any desired material with the slot or tube preferably rectangular in shape. The lens 5 may be held in the end of the tube in any convenient manner. The preferred form of the lens 5 as illustrated herein is a round cylindrical lens preferably of small diameter, for instance 60 mils. In a round lens of small diameter considerable advantage is obtained in the reduction of objectionable effects from spherical aberration which is apparent in the larger lenses both of the round and plano-convex types. The tubular member with its lens is placed between the film 9 and the light sensitive cell 8 and suitably positioned according to the focal length of the lens used and according to the method desired for forming the cone of light rays from a restricted illuminated area of the film to the lens and projection of the light rays to the light sensitive cell.

One arrangement of the tube and lens is shown in Fig. 4 which is a cross sectional view of the tube and lenses shown in Fig. 1. This view is enlarged to illustrate the formation of the light rays when the plane of the film is in one conjugate focus of the lens and the other conjugate focus of the lens is at the alternate end of the tube. In this view R represents the restricted illuminated area of the film on which the lens 5 is focused. Three conjugate focal points have been shown at the film, one center focal point and the two outermost focal points. When the plane of the film is in one conjugate focus of the lens the length of the tube should be such that the end of the tube nearest the light sensitive cell is at the alternate conjugate foci of the light rays from this illuminated area of the film R. The lines 47 and 48 and the lines 40 and 41 represent alternate central conjugate foci of the lens 5. The lines 49 and 50 and the lines 42 and 43 represent light rays converging at alternate outer conjugate foci and the lines 51 and 52 and the lines 44 and 45 illustrate the alternate outer conjugate foci of the lens 5.

The upper and lower inner surfaces 23 and 24 of the tube are blackened or made of light absorbing material in order that any light rays entering the lens 5 from an area beyond the restricted area R will be absorbed by the inner walls of the tube. It is apparent that light rays entering the lens 5 outside of the restricted area R will be directed toward the inner walls instead of being directed through the tube to the light sensitive cell. Thus the light sensitive cell only receives light rays from the restricted area R of the film sound record. This area is approximately 1 mil in width.

By way of example, a tube such as shown in Figs. 1 and 4 may be constructed according to the dimensions given herein. Let it be assumed that lens 5 is a 60 mil lens, that the ratio of magnification desired is 20 to 1 and the index of refraction is 1.58. The dimension H shown in Fig. 1 for this arrangement is 20 mils, the dimension L, 858 mils and the dimension D 42.9 mils. Since the dimension D is shown between the surface of the film and the axis of lens 5, the dimension between the film and the edge of lens 5 is 12.9 mils. The angle of the light rays at Z is 29°. The focal length of the lens is 40.86 mils. Tubes of other dimensions having lenses of different size than 60 mils may be calculated from the following expression of the relationship of the various factors. The height of the tube opening is to the height of the line scanned on the film as the focal length of the lens is to the distance of the plane of the film from the axis of the lens minus the focal length. Also the height of the tube opening is to the height of the line scanned on the film as the distance of the tube opening from the axis of the lens minus the focal length of the lens is to the focal length. For example, if it is desired to employ the 60 mil lens for scanning a 1 mil line with a tube that will permit a wider separation, say 50 mils, between the axis of the lens and the plane of the film, it will be found by calculation based upon the above general expression that the height of the opening at the end of the tube becomes 4.47 mils, and the distance from the axis of the lens to the opening becomes 223.5 mils. In every case the distance of the tube opening from the axis of the lens is to the distance from the plane of the film to the axis of the lens as the height of the slot opening is to the height of the line on the film from which light is collected. The dimension between the end of the tube nearest to the light sensitive cell and the cathode of the light sensitive cell is not of particular importance although it must be arranged so that the angle of light falls within the cathode of the light sensitive cell.

A window 7 is placed at the end of the slot nearest to the light sensitive cell. This window may be made concave for the dispersion of the light rays as they are projected from the end of the tube to the active surface of the light sensitive cell. This window further prevents dust and dirt from entering the tube.

Two arrangements of the tubular slot have been shown in Figs. 2 and 3. These views illustrate a cross section of the slot in the lateral dimension of the film or sound record. The width W is approximately 80 mils, the same as the effective width of the sound record. The dimension L is the same as heretofore given for the tube shown in Fig. 1, which is, however, subject to alteration according to the other optical dimensions of the system. A slot with reflecting parallel side walls is shown in Fig. 2 which is satisfactory and efficient for the sound reproducing system according to the invention. In Fig. 3 the slot is shown wider at W2 than at W for controlling the angle of the light rays which is of benefit in some forms of the invention.

An alternative arrangement has been shown in Fig. 5 in which the plane of the film is shown in the principal focus of lens 5. In this figure, R represents the restricted area of the film sound record viewed by the light sensitive cell. This restricted area R is in all cases approximately 1 mil in width. With this arrangement, light rays pass through the tube in the form of parallel light rays to the light sensitive cell. All of the light rays within the tube have been illustrated as parallel with the edges of the tube which is satisfactory for the purpose of illustration. The light rays are, however, parallel with the central line of the converging light rays forming the cones of light within the restricted area of the film R.

The lens 5, in all forms of the invention here shown, is a cylindrical lens such as a glass rod. This type of lens is mounted with its axis transverse with respect to the direction of movement of the film. As previously indicated, any change in the diameter of the lens 5 affects all of the dimensions of the tube as well as the dimension from the axis of the lens to the film. This type of lens is of a very short focal length and for this reason the distances from the lens to the end of the tube and from the film to the lens are not great. The lens is, however, always maintained sufficiently away from the film to avoid difficulties from rubbing engagement.

The slot or tube is disclosed as rectangular in cross section. This is, however, not essential for the operation of the system and the invention should not be limited to a tube of rectangular cross section.

The top and bottom surfaces of the tube such as 23 and 24 are made black or are made of light absorbent material and roughened in order that light reflections from areas not within the restricted area R be absorbed. The side walls of the slot or tube such as 29 and 30 or 38 and 39 may be light reflecting since such side reflections will cause no objectionable effects upon the element of the light sensitive cell in the reproduction of sound and will increase the light efficiency of the system.

Conductors 18 and 19 are shown connected to the electrodes of the light sensitive cell. These conductors are connected to an amplifier (not shown) for amplifying the electric currents transmitted by the light sensitive cell in accordance with the variations in translucency of the film sound record. These electric currents are transmitted from the amplifier to a loud speaker, not shown.

What is claimed is:

1. In sound film reproducing apparatus a film with a sound record thereon, a source of light of substantially constant intensity on one side of the film, a light sensitive cell on the other side of the film, film viewing means interposed between said cell and the film, said viewing means including a substantially rectangular shaped tube having roughened non-reflecting top and bottom walls and having a lens of short focal length at one end of the tube focused upon a restricted area of said film and interposed so that the plane of the film lies close to the lens but not closer than the principal focus of the lens, said tube being proportioned so that the height of the opening through which light is projected by the lens is to the height of the film area from which light is collected as the distance of the opening from the axis of the lens is to the distance of the axis of the lens from the plane of the film, to obtain a magnified real image of the film area at said opening commensurate with said proportions.

2. In a sound film reproducing apparatus, a source of light, a sound film adapted to be moved continuously, a light sensitive cell, film viewing means interposed between said cell and film, said film viewing means including a tube of substantially rectangular cross section having its top and bottom walls light absorbent with a cylindrical lens of short focal length mounted in one end of said tube focused upon a restricted area of said film and an opening in the other end of said tube having its small dimension proportioned in accordance with said restricted film area to be viewed, said proportions being such that said small dimension is to the height of the film area from which light is collected as the distance of the opening from the axis of the lens is to the distance of the axis of the lens from the plane of the film said viewing means being so positioned that the plane of the film is in one conjugate focus of the lens and said opening in the other conjugate focus.

3. In a sound film reproducing apparatus, a source of light, a sound film adapted to be moved at uniform velocity, a light sensitive cell on the other side of said film from said source of light, film viewing means interposed between said cell and the film including a tube of rectangular cross section having a lens of short focal length mounted in the end of said tube presented to the film and an opening at the other end of said tube presented to said light sensitive cell, the top and bottom walls of said tube being light absorbent and the side walls of said tube being light reflecting.

4. In sound film reproducing apparatus, a source of light, a sound film adapted for movement at a uniform velocity, a light sensitive cell on the opposite side of said sound film from said source of light, lenses on opposite sides of said film for presenting light on one side and taking it off on the other side at a very large solid angle, and a tube of rectangular cross section between said light sensitive cell and the lens on the corresponding side of the film, the top and bottom walls of said tube being light absorbent and side walls light reflecting.

5. Apparatus for reproducing sounds recorded photographically on a film, means for continuously moving said film, a light source for producing a light of constant intensity for illuminating one side of said film, a light sensitive cell for transmitting electric energy over a circuit in response to variations in light, a tube mounted between the opposite side of said film and said light sensitive cell, a lens in the end of said tube nearest the film focused upon a restricted area of said film sound record, said tube being proportioned and positioned with relation to the film according to the focal length of said lens for projecting light rays to said cell according to variations in translucency of the restricted area of the sound record, said tube being rectangular in cross section with the top and bottom walls light absorbent.

6. In sound film reproducing apparatus, a source of light, a sound film adapted to be moved at uniform velocity, a light sensitive cell on the other side of the film from said source of light, film viewing means interposed between said cell and the film including a tube of substantially rectangular cross-section having a lens at the end of said tube toward the film for collecting light from a restricted illuminated area of the film and an opening at the other end of said tube proportioned to pass the light collected by said lens from said restricted portion of said illuminated area, said tube being proportioned so that the height of the opening through which light is projected by the lens is to the height of the film area from which light is collected as the distance of the opening from the axis of the lens is to the distance of the axis of the lens from the plane of the film, the top and bottom walls of said tube being light absorbent.

7. In a sound film reproducing apparatus, a source of light, a sound film adapted to be moved continuously, a light sensitive cell, a film viewing means interposed between said cell and film, said film viewing means comprising an elongated tube of substantially rectangular cross-section and a lens having a cross-sectional area of the same shape as the tube but substantially larger than the cross-sectional area of the tube to provide an adequate focal distance between the film and the tube, said tube being arranged as a lens mouting at the film end in the manner of a stop to provide a viewing means of maximum light efficiency and sharp definition in which the opening of the tube toward the light sensitive cell lies in the plane of the conjugate focus of said lens, said tube being proportioned so that the height of the opening through which light is projected by the lens is to the height of the film area from which light is collected as the distance of the opening from the axis of the lens is to the distance of the axis of the lens from the plane of the film, to obtain a magnified real image of the film area at said opening commensurate with said proportions.

8. In a sound film reproducing apparatus, a source of light, a sound film adapted to be moved continuously, a light sensitive cell, a film viewing means interposed between said cell and film, said film viewing means comprising an elongated tube of substantially rectangular cross-section and a lens in the form of a rod having a substantially greater diameter than the height of the tube to provide an adequate focal distance between the film and the tube, said tube being arranged as a lens mouting at the film end in the manner of a stop to provide a viewing means of maximum light efficiency and sharp definition in which the opening of the tube toward the light sensitive cell lies in the plane of the conjugate focus of said lens, said tube being proportioned so that the height of the opening through which light is projected by the lens is to the height of the film area from which light is collected as the distance of the opening from the axis of the lens is to the distance of the axis of the lens from the plane of the film, to obtain a magnified real image of the film area at said opening commensurate with said proportions.

EDWIN H. SMYTHE.